United States Patent [19]

Kreutz

[11] Patent Number: 4,669,564
[45] Date of Patent: Jun. 2, 1987

[54] SERVICE CONSOLE FOR THE OPERATOR'S POSITION OF A TRACTOR

[75] Inventor: Josef Kreutz, Bergisch Gladbach, Fed. Rep. of Germany

[73] Assignee: Klöckner-Humboldt-Deutz AG, Cologne, Fed. Rep. of Germany

[21] Appl. No.: 788,005

[22] Filed: Oct. 16, 1985

[30] Foreign Application Priority Data

Oct. 16, 1984 [DE] Fed. Rep. of Germany ....... 3437791

[51] Int. Cl.⁴ .......................................... B62D 33/06
[52] U.S. Cl. ................... 180/89.12; D15/30; 296/35.1; 296/190
[58] Field of Search ............... 180/315, 316, 317, 318, 180/320, 313, 219, 89.12, 68.1, 68.2; 296/35.1, 190, 70, 72; D15/23, 30

[56] References Cited

U.S. PATENT DOCUMENTS 4,088,364 5/1978 Termont ...................... 180/89.12 X

FOREIGN PATENT DOCUMENTS 65040 11/1982 European Pat. Off. ............. 180/90
2303698 10/1976 France ............................ 180/89.12

Primary Examiner—John J. Love
Assistant Examiner—Mitchell J. Hill
Attorney, Agent, or Firm—Watson, Cole, Grindle & Watson

[57] ABSTRACT

A service console for the operator's position of a tractor which, as seen from the side, has a mushroom shape and is mountable into the front wall of the cabin of the tractor as a unit, the console at about its center supporting an inverted U-shaped bar for detachable connection to the front wall, so that the part of the console behind the bar extends into the cabin and the other part in front of the front wall extends forward into the area of the motor.

6 Claims, 3 Drawing Figures

4,669,564

SERVICE CONSOLE FOR THE OPERATOR'S POSITION OF A TRACTOR

BACKGROUND OF THE INVENTION

1. Field of the Invention

This invention relates to a service console for the operator's position of a tractor which is designed as a closed unit facing the engine in front of the driver's seat and which is fastened with its bottom part, preferably independently of the adjoining components of the operator's position or, respectively, a cabin, detachably to the chassis or similar part of the tractor, wherein all control parts of the tractor are located so that they can be reached from the operator's position.

2. The Prior Art

A block-shaped service console for the operator's position of a tractor is disclosed in U.S. Pat. No. 3,656,799. The console is located inside a cabin in front of the wall thereof which protects the operator's position and separates it from the motor area. The console contains important service elements such as the steering gear, the gear shift, etc. However, the console does not incorporate any ventilation, heating or air conditioning elements. These elements must be, to the extent that they are required, mounted outside the cabin, which necessitates considerable effort and requires additional housing space. Moreover, because of the block-shaped design of the console, the space for the feet of the driver is very limited, which makes it particularly difficult to enter or exit the driver's position.

SUMMARY OF THE INVENTION

The object of the present invention is to provide a service console of the aforementioned type whose construction is suitable for housing all service elements required for the operation of a tractor, including ventilation, heating and air conditioning elements and which is also adapted to the circumstances of the existing interior space and provides sufficient freedom of movement for the driver.

This object is achieved by providing the service console with the following features:

(a) as seen from the side, it has a mnushroom-shaped design;

(b) in its transverse direction, primarily in the center, it is tightly encircled by an inverted U-shaped vertical bar;

(c) a first part of the console which extends from the bar protrudes into the operator's position; and (d) a second part of the console extends forward in the direction of the engine through the front cabin wall with a U-shaped recess which encircles it at the U-shaped bar.

Because of the mushroom-shaped design of the console, all necessary service units can be arranged in such a way that they can be comfortably reached by the operator, and enough freedom of movement is provided for the operator while in the sitting position and also while entering and exiting. Moreover, this design of the console provides the opportunity to arrange all parts in such a way that they are readily accessible, for instance, for maintenance. The U-shaped bar makes it possible to connect the front cabin wall with the console so that it can easily be separated while still providing a good seal. The part of the console facing forward from the U-shaped bar extends into the motor area which is usually not utilized to house other components. That part of the console accepts those units which are not required in the other part or cannot be placed there for lack of space; the noisy blower, for instance.

In a further aspect of the invention, that part of the console which extends into the operator's position houses all the parts which the driver needs to control the vehicle; particularly the steering gear, all levers, pedals and switches, as well as the instrument panels and the air ducts.

With regard to the arrangement of the components to be housed inside the console, all parts related to the ventilation, heating and (optionally) air conditioning of the cabin are located in that part of the console which extends into the motor area.

The U-shaped bar has a U-shaped profile in cross section to divert rainwater, and its rear web adjoins and seals with the front wall of the cabin.

Furthermore, to make the operator's area easy to work in, it is useful to design the bottom part of the console as a mount with a sloping plate serving as a foot rest.

Finally, it is advantageous under prevailing conditions if the steering column is inclined where it passes through the upper part of the console and through the floor area, which is open toward the driver's seat, up from a steering pump of the hydraulic steering system located in the bottom part.

Further features and advantages of the present invention will become more apparent by reference to the attached drawings when considered in conjunction with the following discussion.

DETAILED DESCRIPTION OF THE PREFERRED EMBODIMENT

Figure 1:
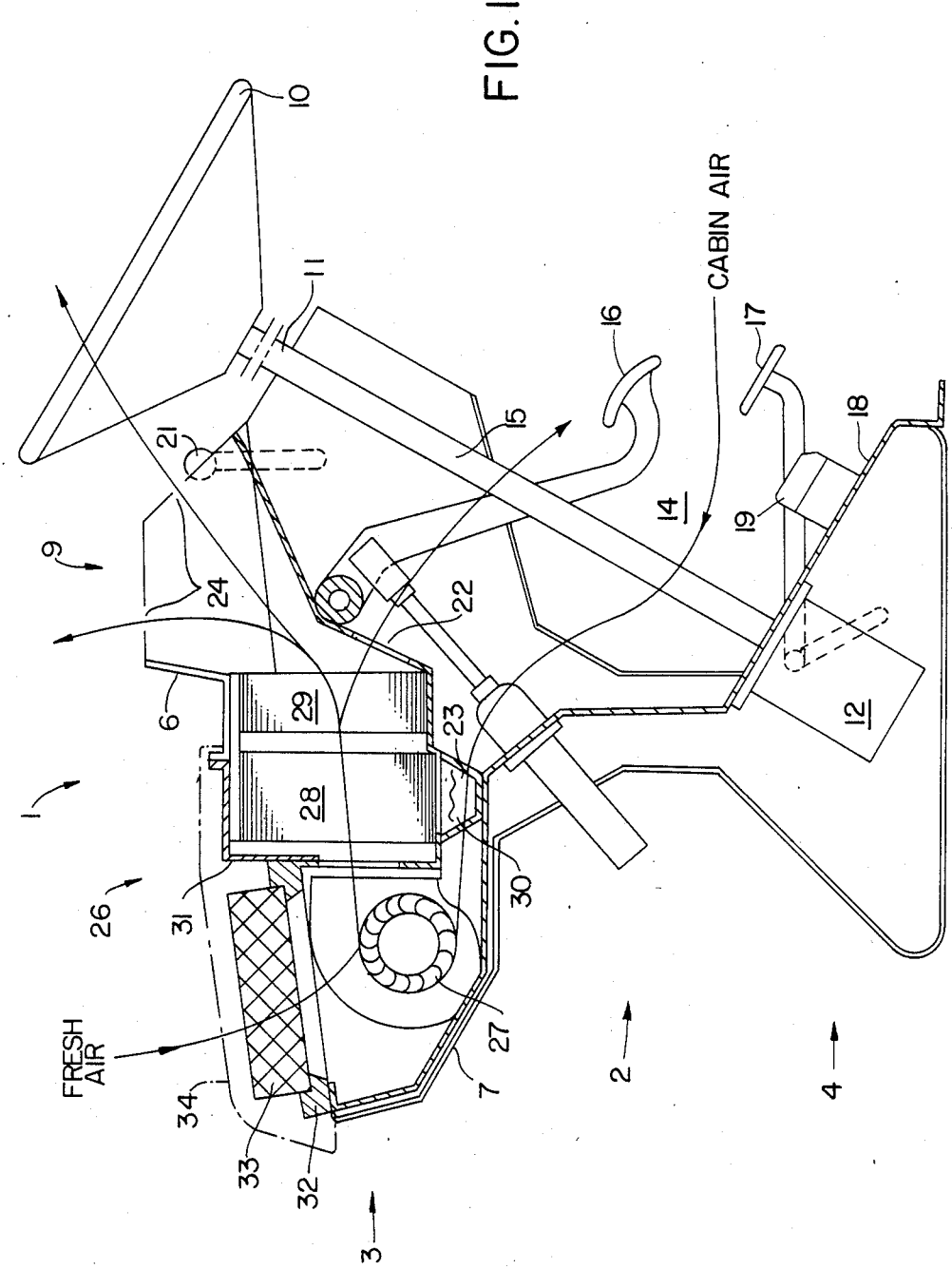
FIG. 1 shows an elevational side view of a service console in accordance with the invention.
Figure 2:
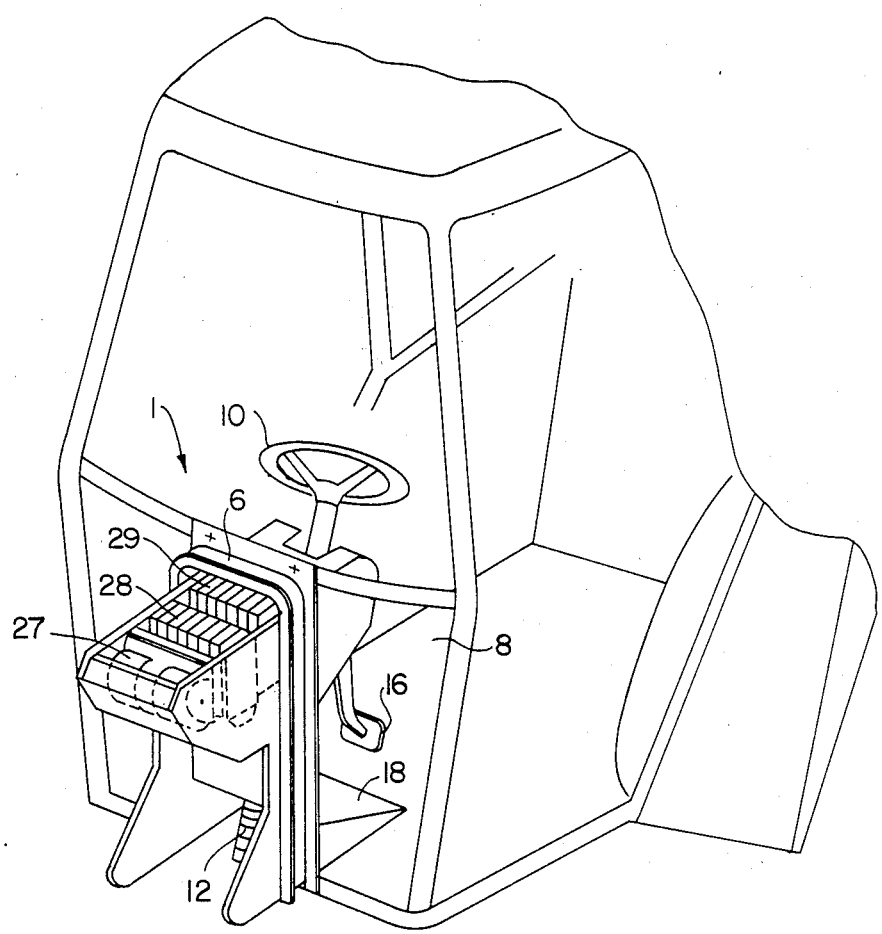
FIG. 2 shows a perspective view of the inventive service console when mounted in the front wall of the cabin of a tractor.
Figure 3:
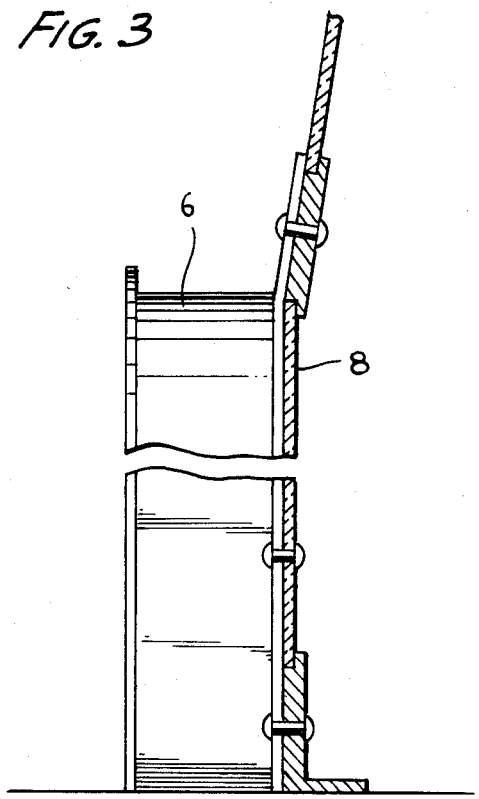
FIG. 3 shows a side elevation, partially broken away, of the U-shaped bar and the front wall of the operator's cabin.

FIG. 1 is a side view of the somewhat mushroom-shaped service console for the operator's position of a vehicle which, through a relatively narrow center part 2, has an upper part 3 which protrudes to the front and rear in the longitudinal direction of the vehicle. The service console 1 rests on a bottom part 4 of which, seen from the side, has an almost triangular shape. As can be seen in FIGS. 2 and 3, an inverted U-shaped bar 6 is located at and encircles the service console 1 at about its center and is connected to, and provides a seal for, the casing 7 of the service console 1. The cross section of bar 6 has a U-shaped profile which serves as a conduit for water for the front cabin wall 8, which is itself connected to the rear web 6a of the bar 6 to provide a seal.

The part 9 of the service console is located behind the U-shaped bar 6 and projects into the operator's position facing the engine, so that this part 9 can be reached easily from the driver's seat. This part 9 of the service console 1 is also designed in such a way that the operator can assume a comfortable position. A steering wheel 10, located above the upper part 3 of the service console 1, is connected through a tilted steering column 11 which leads through the upper part 3 of the service console 1 to a steering pump 12 for the hydraulic steering system which is located in the bottom part 4. The steering column 11 herein leads below the upper part 3 of the console through a floor area 14, located in the region of the center part 2, which is open toward the driver's seat. Inside the upper part 3 of the service console 1, in the steering column 11, is a joint 15 with a lock by means of which the tilt of the steering wheel 10 can be adjusted. In the floor area 14 are located pedals 16 and 17 for engaging the brakes, the clutch, and for the gas pedal. A switch 19 for engaging an electric differential pawl is located on a plate 18 of the bottom part 4 which serves as foot support. A hand lever 21 on the upper part 3 near the steering wheel 10 can serve, for instance, as a control for the adjustment of the heating system. Several air vents 22 to 24 provide a supply of fresh air or recirculated air and/or heated air for heating the cabin.

The part 26 of the service console 1, located in front of the U-shaped bar 6 facing the engine, in its upper part 3 has a blower 27, which is appropriately designed as an axial blower. Connected to the blower 27 is an evaporator 28 and a heat exchanger 29. The evaporator 28 has, in the lower area, a collection and run-off basin 30 for condensed moisture. The upper cover of the evaporator 28 is formed by a cover 31 which adjoins the U-shaped bar 6; the cover 31 has an opening in front of the evaporator 28 with a device 32 for mounting the air filter 33. Part 26 of the service console 1 is closed on top by a cover 34 which, at least in the area of the air filter 33, is provided with openings for the passage of air.

The service console 1 can be assembled entirely outside of the cabin before it is screwed in during installation of the chassis or the cabin. The ventilation, heating, and air conditioning system is constructed in such a way that it can operate without hose connections for the air ducts merely with blower 27. Moreover, in this service console all hydraulic connections are located outside the cabin as are the connections for the heating and air conditioning system, so that damage through leaks of the connections indicated can be avoided inside the cabin.

I claim:

1. A service console for use on a tractor which includes a chassis, a motor and an operator's cabin, the operator's cabin including a front wall facing the motor and an operator's position therein, said front wall having a rectangular opening therein, said service console being designed as a closed unit in the direction of the motion of the tractor in front of the driver's seat and is preferably independent of adjoining components of the operator's position or the cabin, said service console having a bottom part which is detachably mountable on the chassis of the tractor so that the service console will fit in the rectangular opening in the front wall of said operator's cabin and so that all service parts for the tractor will be located so that they can be reached from the operator's position, and wherein (a) the service console, as seen from the side, has a mushroom-shaped design;
   (b) the service console in the transverse direction is encircled and is sealed basically in its center by an inverted U-shaped bar;
   (c) a first part of the service console extends from said bar into the operator's cabin, and
   (d) a second part of the service console extends forward of the front wall of the cabin in the direction of the motor.

2. A service console in accordance with claim 1, wherein said first part of said service console contains all the elements which the operator needs to control the tractor, including the steering system, all levers, pedals and switches, the instrument panels, and the air ducts.

3. A service console in accordance with claim 2, wherein said second part of said service console accommodates all elements for the ventilation, heating and air conditioning of the operator's cabin.

4. A service console in accordance with claim 1, wherein the U-shaped bar has a U-shaped cross section for deflecting rain water, said U-shaped bar having a front web and a rear web, and wherein said rear web is joined in a watertight manner to said front wall of said operator's cabin.

5. A service console in accordance with claim 1, wherein the bottom part of said service console is designed as a mount with an inclined plate as a foot rest.

6. A service console in accordance with claim 1, wherein said bottom part includes a hydraulic steering pump, and wherein said service console includes an upper part and a steering column, said steering column extending in a tilted fashion from said bottom part, through an open floor area, to said upper part.

* * * * *